United States Patent
Taniguchi et al.

[11] Patent Number: 5,999,830
[45] Date of Patent: Dec. 7, 1999

[54] TDMA MOBILE COMMUNICATION DEVICE FOR REDUCING A POWER CONSUMPTION AND METHOD

[75] Inventors: Tomoyuki Taniguchi, Misato; Wataru Kataoka, Tokyo, both of Japan

[73] Assignee: Kabushiki Kaisha Toshiba, Kawasaki, Japan

[21] Appl. No.: 08/928,022

[22] Filed: Sep. 11, 1997

[30] Foreign Application Priority Data

Sep. 12, 1996 [JP] Japan .................................... 8-241889

[51] Int. Cl.⁶ .................................................. H04Q 7/32
[52] U.S. Cl. ........................................... 455/574; 455/462
[58] Field of Search .................................... 455/462, 573, 455/574, 38.3, 343

[56] References Cited

U.S. PATENT DOCUMENTS 5,519,762  5/1996  Bartlett ..................................... 455/574
5,596,626  1/1997  Nakayama ............................... 455/462

*Primary Examiner*—William Cumming
*Attorney, Agent, or Firm*—Oblon, Spivak, McClelland, Maier & Neustadt, P.C.

[57] ABSTRACT

A mobile communication device includes power supply control switches corresponding to a local oscillator, transmitting frequency converter, receiving frequency converter, receiving amplifiers and transmitting power amplifier in a radio unit, and a battery saving control circuit in a control unit. By individually controlling the ON timing of the switches by means of the battery saving control circuit, it is possible, prior to a time slot period allocated to an individual mobile station, first to supply power to the local oscillator, then supply power to the frequency converters, and then supply power to amplifiers. By doing so the mobile communication device is set in a standby state for transmitting/receiving operation.

17 Claims, 8 Drawing Sheets

TDMA MOBILE COMMUNICATION DEVICE FOR REDUCING A POWER CONSUMPTION AND METHOD

BACKGROUND OF THE INVENTION

The present invention relates to a mobile communication device for use in a system connected by a TDMA scheme between a base station and a plurality of mobile stations, such as a digital cordless telephone system and a celluler communication system.

In recent years, various mobile communication systems have been developed with an advance in the communications technique and a growing need for communications. As one of them there is a digital cordless telephone system called a PCS (personal communication system).

This type of system comprises, as shown in FIG. 8 for instance, a plurality of base stations CS1, CS2, CS3, . . . connected via wire telephone lines to the public switched telephone network NW and a plurality of mobile stations PS1, PS2, . . . connected via radio channels to these basic stations CS1, CS2, CS3, . . . The respective mobile stations PS1, PS2, . . . make their mutual communication via the corresponding base stations or relative to the corresponding subscriber terminal connected to the public switched telephone network NW.

Here, a 4 channel TDMA (time division multiple access)—TDD (time division duplex) scheme is adopted as a radio access scheme between the base stations CS1, CS2, CS3, . . . and the mobile stations PS1, PS2, . . .

The radio access scheme has a transmission signal frame, that is, a signal frame transmitted on a plurality of radio carriers f1 to fm, comprised of four time slots FL1 to FL4 for forward link used for communication from the respective mobile station to the corresponding base station and four time slots RL1 to RL4 for reverse link from the base station to the corresponding mobile station, as shown in FIG. 9 for instance. The radio communication is done between the mobile station and the base station by allocating, as information channel to the mobile stations, a pair of each of time slots FL1 to FL4 for forward link and a corresponding one of time slots RL1 to RL4 for reverse link. That is, the four information channels are provided for each radio carrier.

In the mobile communication device adopting this type of radio access scheme, an important task is how long the life of a battery unit has to be extended. In order to realize this task, various types of battery saving schemes have thus far been proposed. Some saving scheme is adopted to suppress any unnecessary power consumption by cutting off a power supply from the battery unit to a radio unit in other than those time slots of the information channel allocated to an individual mobile station for instance. This type of conventional system will be set out below.

FIG. 10 is a view showing an arrangement of a radio unit of a mobile communication device adopting this battery saving scheme. In FIG. 10, an operation voltage of a control unit 50 is supplied through a switch SW6 to a local oscillator 14. Further, the operation voltage of a power source unit is supplied via a switch SW7 to a frequency converter 151 and transmission power amplifier 152 in a transmitting circuit. On the other hand, the operation voltage from the power source unit is supplied via a switch SW8 to a frequency converter 131 and amplifiers 132 and 133 in a receiving circuit.

The respective switches SW6, SW7, and SW8 are ON-OFF controlled by corresponding switch control signals output from the control unit 50.

In such arrangement, at a transmission period, the switch SW6 is first turned ON at a time point a predetermined time T1 earlier than a start time point of a transmitting time slot, while giving consideration to a delay rise of the local oscillator 14. For this reason, an operation voltage is supplied from the power source unit to the local oscillator 14 where an oscillation operation is started. Then a switch SW7 is turned ON at a time point a predetermined time T2 earlier than a start time point of the transmitting time slot. For this reason, an operation voltage is supplied from the power source unit to the frequency converter 151 and transmission power amplifier 152 in the transmitting circuit. By doing so, the frequency converter 151 and transmission power amplifier 152 in the transmitting circuit become operative. In this connection it is to be noted that the time T2 is set in accordance with a time taken for a variation in oscillation frequency occurring in the local oscillator 14 at a start time of the frequency converter 151 to converge.

At the period of transmitting time slot, a modulated signal output form a modulation circuit, not shown, is input to the frequency converter 151. In the frequency converter 151, the modulated signal is mixed with the local oscillation signal generated from the local oscillator 14 and is frequency-converted to a signal for a radio carrier. The transmission radio carrier signal, after being amplified by the transmission power amplifier 152 to a predetermined transmitting power level, is transmitted from an antenna, not shown, to the base station.

When the period of transmission time slot is ended, the switch control signal is output from the control unit 50 and the switches SW6 and SW7 are turned OFF. For this reason, the supply of a power from the power source unit to the local oscillator 14 and transmitting circuit is stopped, so that the transmitting system is set in a battery saving state.

At a receiving time, on the other hand, as shown for example in FIG. 12, the switch SW6 is first turned ON a predetermined time T1 earlier than the start time point of the receiving time slot as in the case of the transmitting time. For this reason, an operation voltage is supplied from the power source unit to the local oscillator 14, so that the local oscillator 14 starts its oscillation operation. Then the switch SW8 is turned ON at a time point a predetermined time T3 earlier than the receiving time slot starting time. For this reason, the operation voltage is supplied from the power source unit to the frequency converter 131 and amplifiers 132, 133, so that the frequency converter 131 and amplifiers 132 and 133 are set in an operative state. The time T3, like the time T2, is set in accordance with a time taken for a variation in the oscillation frequency occurring in the local oscillation circuit 14 at a start time of the frequency converter 131 to converge.

When, in this state, the receiving time slot period is entered and the radio carrier signal directed to the corresponding individual mobile station is received by the antenna, not shown, the radio carrier signal, after being amplified by the high frequency amplifier 132, is input to the frequency converter 131. In the frequency converter 131, the radio carrier signal is mixed with the local oscillation signal generated from the local oscillator 14 and frequency-converted to a reception signal of an intermediate frequency or baseband frequency. The reception signal, being amplified by the amplifier 133, to a demodulation circuit, not shown, where it is demodulated.

When the receiving time slot period is ended, the switches SW6, SW8 are turned OFF by the control of the control unit 50 and hence the supply of electric power to the local oscillator 14 and receiving circuit is cut off, so that the receiving system is set in a battery saving state.

That is, in the arrangement above, the respective circuits of the receiving and transmitting systems receive power supply only during the receiving and transmitting time slots and are made in an operative state. And during the other idle period, these circuits are placed in a not-operated state. For this reason, the dissipation power of the mobile station is reduced in comparison with the case where the power is constantly supplied to the respective circuit of the receiving and transmitting systems. By doing so, it is possible to extend the life of the battery unit.

However, the above-mentioned conventional circuit has the following tasks to be solved. That is, the timing of the power supply to the frequency converter is so set as to be adequately earlier than the start time points of the receiving and transmitting time slots, taking into consideration the time taken for a variation in the oscillation frequency in the local oscillator at a start of the frequency converter to converge as set out above. The start times of the respective amplifiers are normally very shorter than the time at which the frequency variation of the local oscillator converges.

Either in the receiving circuit or in the transmitting circuit, the conventional circuit simultaneously control the power supply to the frequency converter and respective amplifiers. In the respective amplifiers, therefore, from the setting of their operative state by the power supply to the starting of their actual signal amplification operation following the reaching of the receiving time slot or transmitting time slot, there occurs an unnecessary power dissipation over a relatively long period of time. Since the transmission power amplifier 152 consumes more power than the remaining circuits, it adversely affects the life of the battery unit, thus offering a bar to effectively achieve an effective battery saving.

BRIEF SUMMARY OF THE INVENTION

It is accordingly the object of the present invention to provide a mobile communication device which, by preventing any adverse influence over the transmitting/receiving operation resulting from a frequency variation at a local oscillator, can maintain high operation reliability and, in addition, improve more battery saving effect through further reduction of a dissipation power by amplifiers, etc.

In order to achieve the above-mentioned object of the present invention, the mobile communication device of the present invention includes first, second and third switches provided at a power supply path between a power supply unit on one hand and a local oscillator, frequency converter and transmitting power amplifier on the other hand and first, second and third power supply control sections. In the first power supply control section, the first switch is turned ON a first predetermined time previous to the starting point of a transmission period to start the power supply to the local oscillator. In the second power supply control section, the second switch is turned ON after the starting of the power supply to the local oscillator but a second predetermined time previous to the start time point of the transmission period to start the power supply to the frequency converter. In the third power supply control section, the third switch is turned ON after the starting of the power supply to the frequency converter but more than a third predetermined time previous to the start time point of the transmission period to start the power supply to the transmitting power amplifier.

According to the first invention it is possible to individually control the drive timing of the local oscillator, frequency converter and transmitting power amplifier. With the start time point of the transmission period as a reference, for example, the transmitting power amplifier is driven a start-up time earlier and the frequency converter is driven a time earlier for the output variation of the local oscillator resulting from its operation to converge. Further, the local oscillator is driven a start-up time earlier than the drive start time point.

By preventing any adverse influence over the transmitting operation due to a variation in the oscillation frequency in the local oscillator at the start of driving the frequency converter it is possible to reduce the time of the power supply to the transmitting power amplifier to a minimal necessary extent. It is, therefore, possible to further reduce the dissipation power and extend the life of a battery unit.

The mobile communication device according to the second invention includes first, second and third switches individually provided at a power supply path between a power source unit on one hand and a local oscillator, frequency converter and received signal reproducing circuit on the other hand and first, second and third power supply control sections. In the first power supply control section, the first switch is turned ON a predetermined time earlier than the start time point of a reception period to supply the power to the local oscillator. In the second power supply control section, the second switch is turned ON after the start of the power supply to the local oscillator but more than a second predetermined time previous to the start time point of the reception period. In the third power supply control section, the third switch is turned ON after the start of the power supply to the frequency converter but more than a third predetermined time previous to the starting time of the reception period to supply the power supply to the received signal reproducing circuit.

According to the second invention, even if, at a reception period, an individual mobile station receives its own signal incoming from a base station, it is possible to individually control the drive timing of the local oscillator, frequency converter and received signal reproducing circuit. With the start time point of the reception period as a reference for example, the received signal reproducing circuit is driven a start-up time earlier and the frequency converter is driven a given time earlier, that is, a time taken for the output variation in the local oscillator at the starting of its operation to converge. The local oscillator is driven a start-up time earlier than a drive start time point of the frequency converter.

By preventing any adverse influence over the transmitting operation due to a variation in the oscillation frequency in the local oscillator at the start of driving the frequency converter, it is possible to reduce the time of the power supply to the received signal reproducing circuit to a minimal necessary extent. It is, therefore, possible to reduce the dissipation power and, by doing so, to extend the life of a battery unit.

The mobile communication device according to the third invention includes first, second and third switches individually provided at a power supply path between a power source unit on one hand and a local oscillator, frequency converter and receiving amplifier circuit, on the other hand, and first, second and third power supply control sections. In the first power supply control section, the first switch is turned ON a first predetermined time previous to the start time point of an idle period to start the power supply to the local oscillator. The second switch is turned ON after the starting of the power supply to the local oscillator but a second predetermined time period previous to the idle period to start the power supply to the frequency converter. Further, the third switch is turned ON after the starting of the power supply to the local oscillator but more than a third predetermined time previous to the start time point of the idle period to start the power supply to the receiving amplifier circuit.

According to the third invention, even if the receiving field strength of a radio carrier signal incoming from another base station is to be detected by utilizing the idle period, it is possible to individually control the start timings of the power supply to the local oscillator, frequency converter and receiving amplifier circuit. In the case where the start timings of the power supply to the frequency converter and receiving amplifier circuit are set to be equal, it is possible to reduce the power dissipation.

Since the intermediate frequency filter is provided in the receiving circuit and the receiving field strength detection circuit detects an RSSI through the AM demodulation, even if any frequency variation of the local oscillation output intrudes into the idle period, there is no risk of the RSSI detection operation being adversely affected by the frequency variation. It is, therefore, possible to set the timing of the power supply to the frequency converter equal to the start time point of the idle period and, by doing so, to reduce any waste power dissipation by the frequency converter to substantially zero.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION (First Embodiment)

Figure 1:
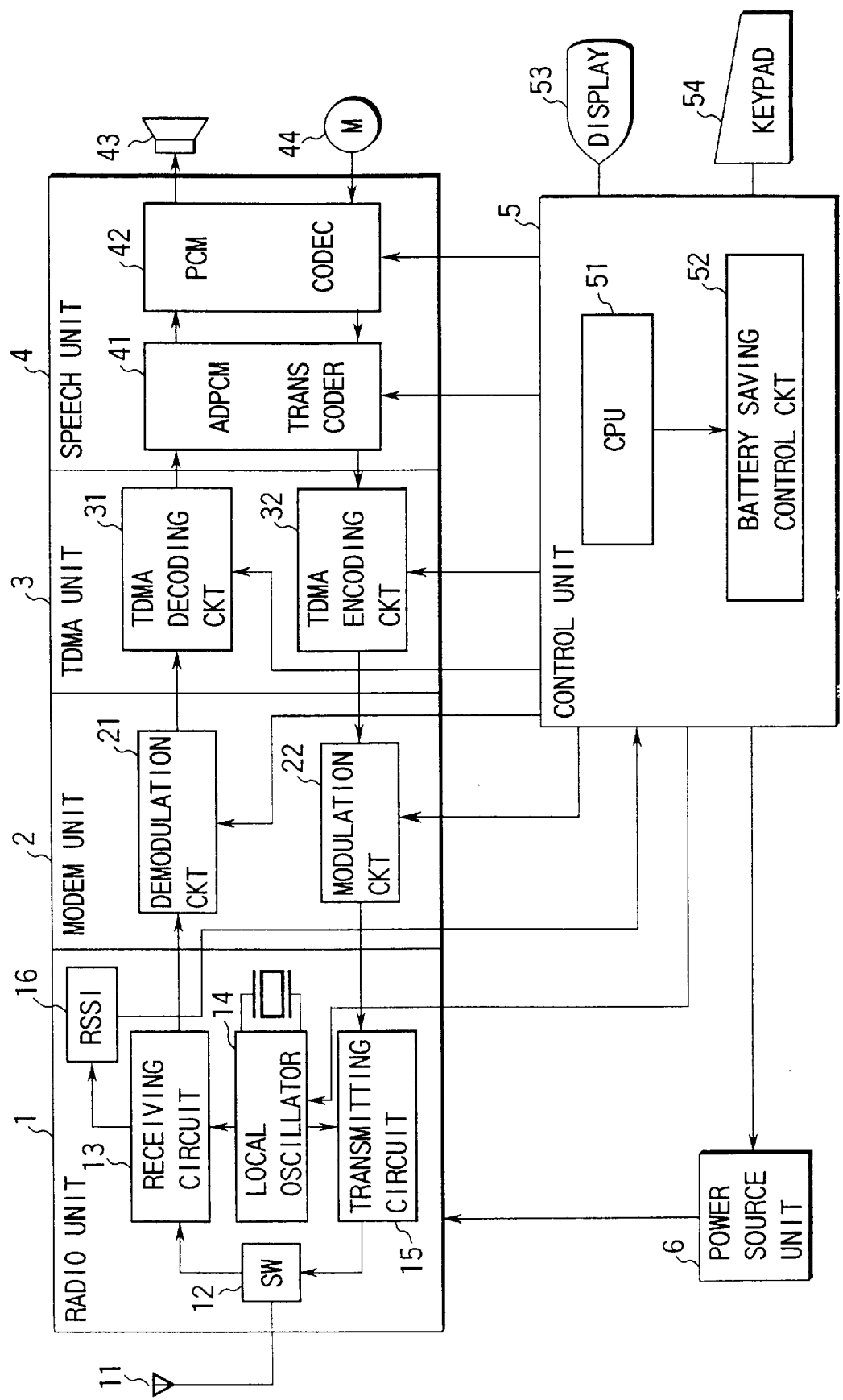
FIG. 1 is a block circuit showing a mobile communication device according to a first embodiment of the present invention.

FIG. 1 is a block diagram showing a mobile communication device according to a first embodiment of the present invention.

The mobile communication device comprises a radio unit equipped with an antenna 11, a modem unit 2, a TDMA unit 3, a speech unit 4, a control unit 5 including a display unit 53 and keying-in circuit 54, and a power supply unit 6.

That is, a radio carrier signal coming from a base station, not shown, after being received at the antenna 11, is input to a receiving circuit 13 via a high frequency switch (SW) 12 in the radio unit 1. In the receiving circuit 13, the received radio carrier signal is mixed with a local oscillation signal from a local oscillator 14 and then down-converted to a receiving intermediate frequency signal. The local oscillation frequency generated from the local oscillator 14 is designated by the control unit 5 in accordance with a radio channel frequency. Further, a receiving field strength detector (RSSI) 16 is provided in the radio unit 1. The received field strength detector 16 detects the received field strength of the radio carrier signal coming from the base station and a detected value is informed to the control unit 5.

The receiving intermediate frequency signal output from the receiving circuit 13 is input to a demodulating circuit 21 in the modem unit 2. The modulation circuit 21 effects the digital demodulation of the received intermediate frequency signal to reproduce a digital speech signal.

A TDMA decoding circuit in the TDMA unit 3 takes out a digital speech signal from a receiving time slot allocated to an individual mobile station, in accordance with the designation of the control unit 5, and inputs the digital speech signal to the speech unit 4. The speech unit 4 comprises an adaptive differential PCM (pulse code modulation) transcoder (hereinafter referred to as an ADPCM transcoder) 41 and a PCM CODEC 42. The digital speech signal is sequentially decoded by the ADPCM transcoder 41 and PCM CODEC 42 to reproduce an analog speech signal. And the analog speech signal is amplified by a amplifier, not shown, and output as a receiving speech voice from a speaker 43.

An sending speech voice input to a microphone 44 is sequentially coded by the PCM CODEC 42 and ADPCM transcoder 41 to generate a digital speech signal. In the TDMA encoding circuit 32, the digital speech signal output from ADPCM transcoder 41 is inserted into a transmitting time slot designated from a control unit 5. The modulation circuit 22 effects the digital modulation of a transmitting intermediate frequency signal by the digital speech signal and the modulated transmitting intermediate frequency signal is input to the transmitting circuit 15. In the transmitting circuit 15, the modulated transmitting intermediate frequency is mixed with the local oscillation signal generated from the local oscillator 14 and up-converted to the radio carrier frequency and then amplified to a predetermined transmitting power level. And the radio carrier signal output from the transmitting circuit 15 passes through a high frequency switch 12 and transmitted from the antenna 11 to the base station, not shown.

Figure 2:
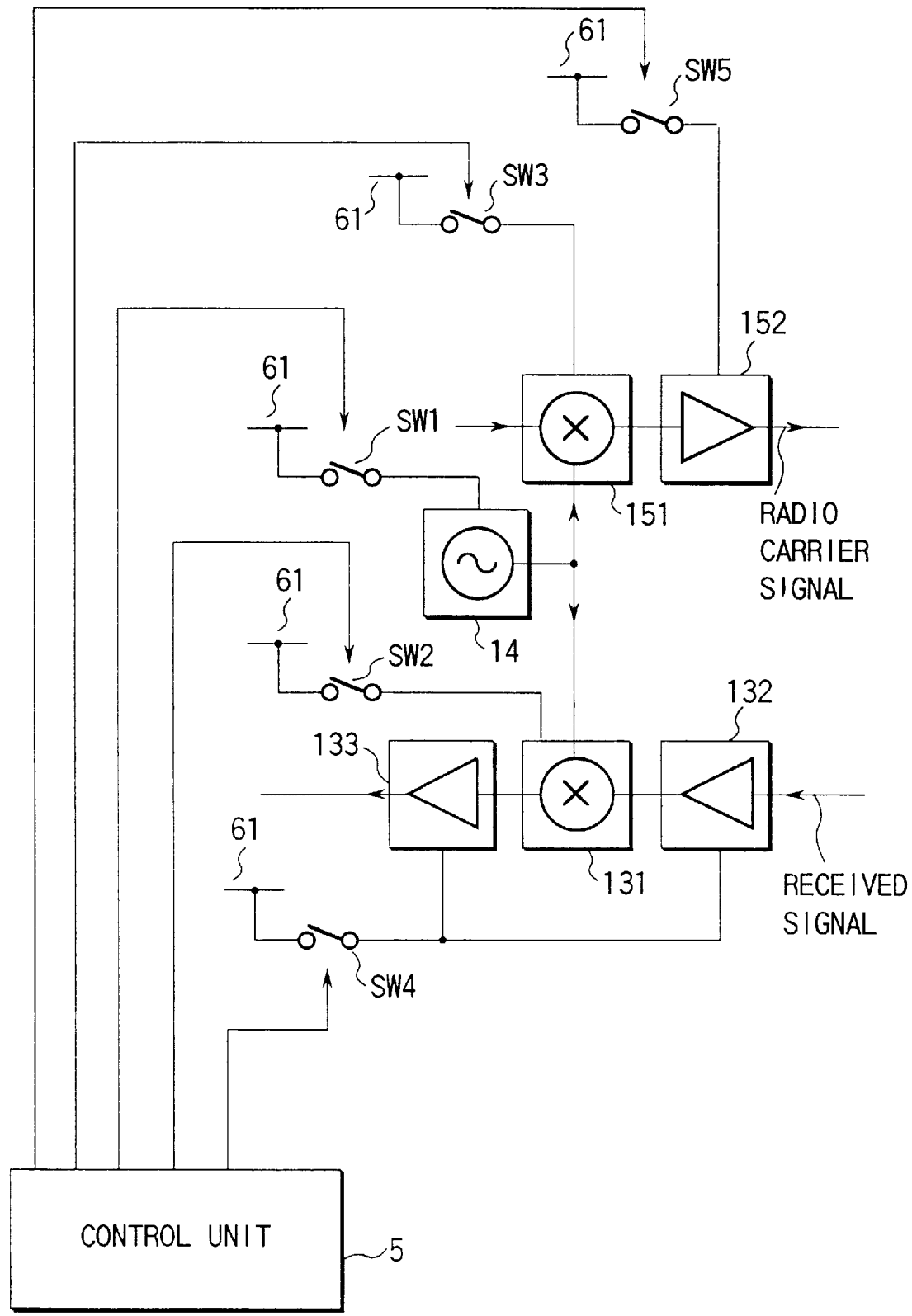
FIG. 2 is a block circuit showing an arrangement of a radio unit in the mobile communication device shown in FIG. 1.
Figure 8:
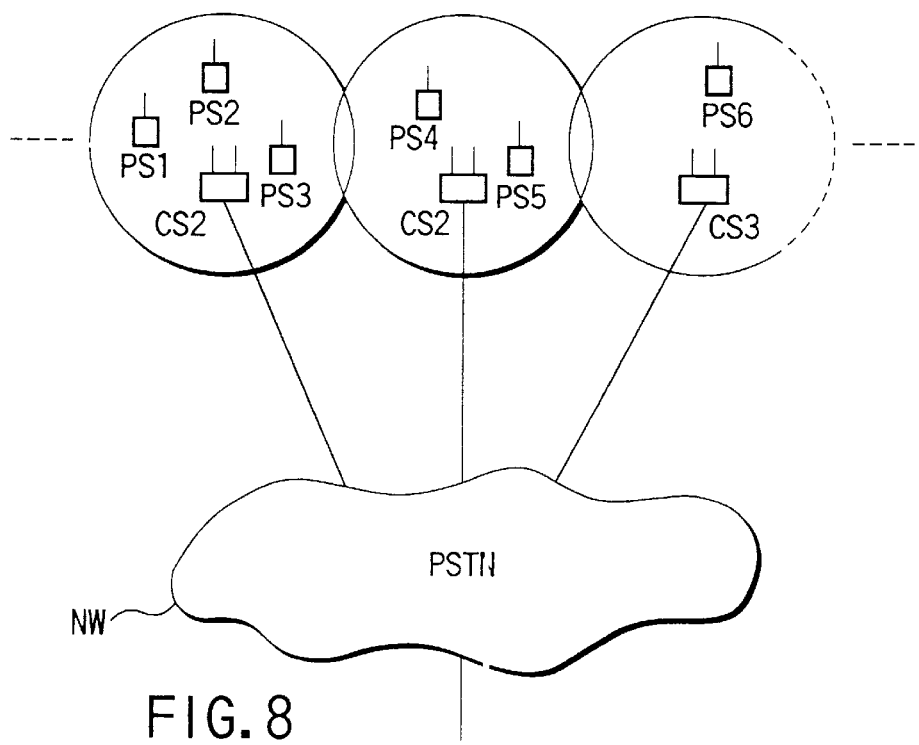
FIG. 8 is a diagrammatic view showing a PCS system.
Figure 9:
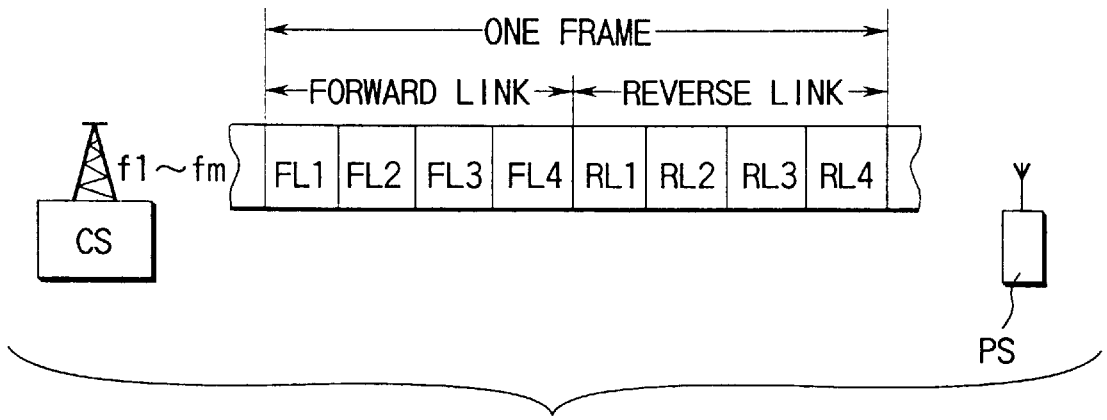
FIG. 9 is a schematic view showing a frame of a 4-channel multi-carrier TDMA-TDD system.
Figure 10:
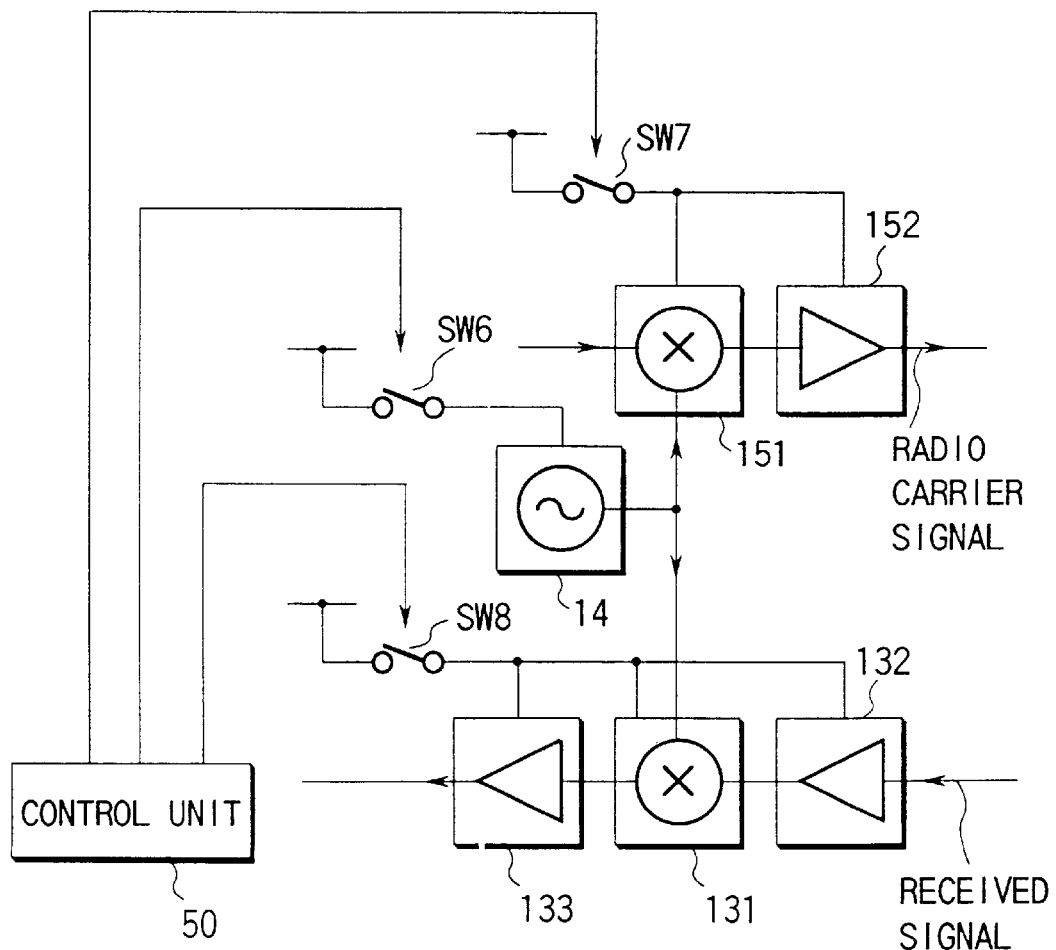
FIG. 10 is a view showing an arrangement of a radio unit in a conventional mobile communication device.
Figure 11:
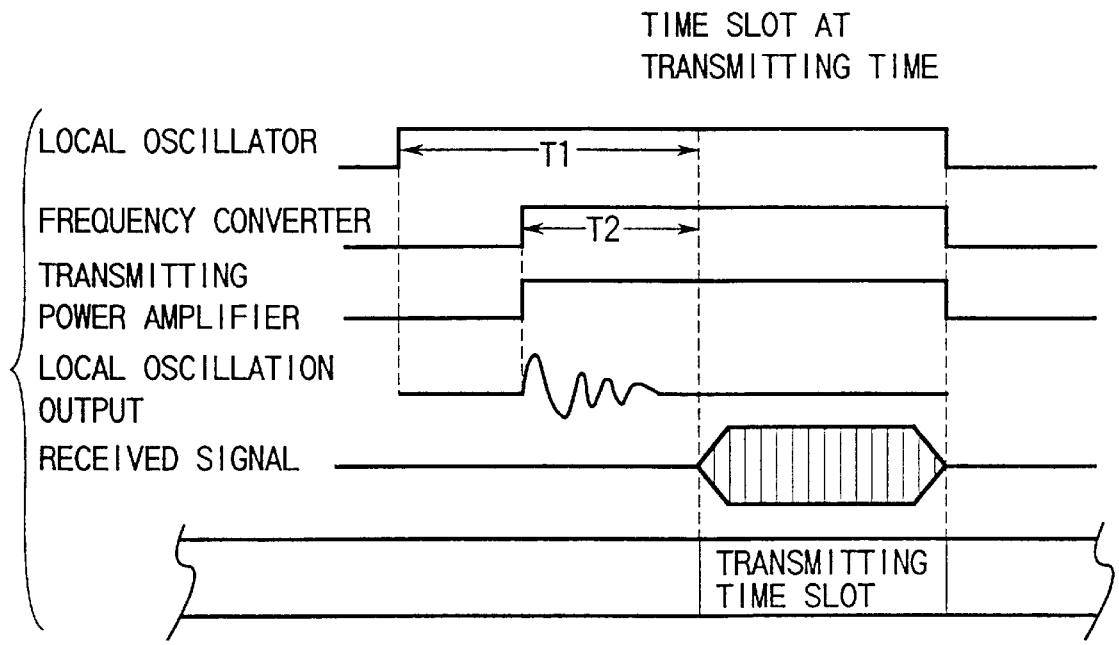
FIG. 11 shows a time chart, at a transmitting time, for explaining a conventional battery saving system.
Figure 12:
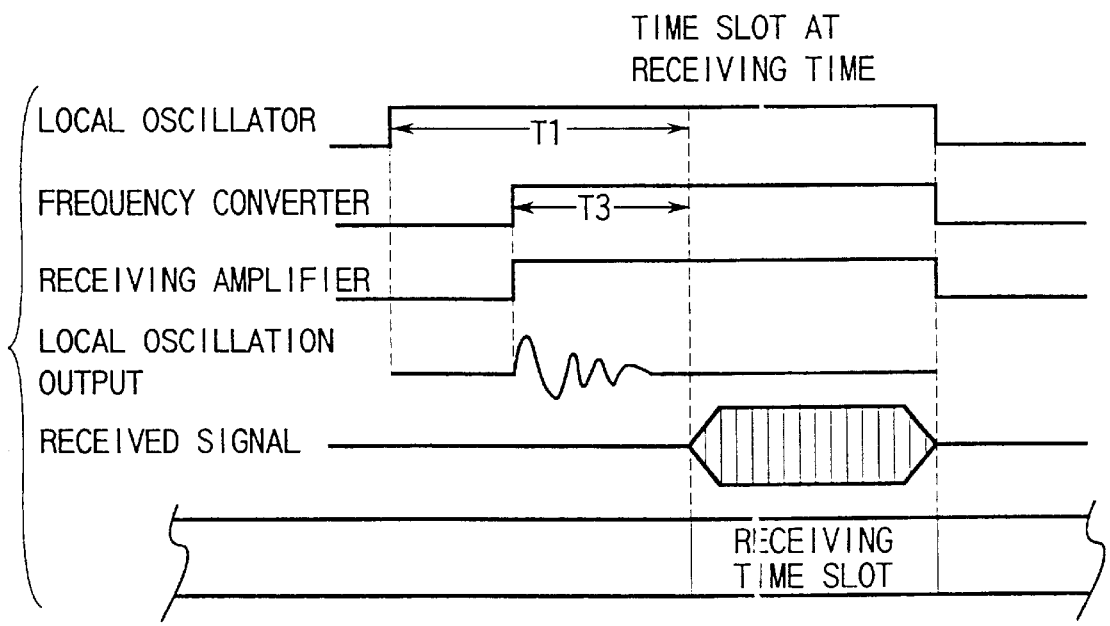
FIG. 12 shows a time chart, at a receiving time, for explaining a conventional battery saving system.

The radio unit 1 is so configured as set out below. FIG. 2 is a block circuit showing a major configuration of the radio unit 1. In FIG. 2, the same reference numerals are employed to designate parts or elements corresponding to those shown in FIG. 8.

In FIG. 2, a switch SW1 is connected between a power source unit 6 and the local oscillator 14, a switch SW2 between that and a frequency converter 131, a switch SW3 between that and a frequency converter 151, a switch SW4 between that and a receiving amplifiers 132, 133 and a switch SW5 between that and a transmitting power amplifier 152. These switches are each comprised of, for example, a semiconductor switch and operated, in an ON/OFF fashion, by the designation of the control unit 5.

On the other hand, the control unit 5 comprises a microcomputer (CPU) 51 and a battery saving control circuit 52. CPU 51 includes a program ROM and data RAM and effects radio channel connection control, switching control, speech control, receiving field strength measuring control, etc. The battery saving control circuit 52 generate signals controlling the ON/OFF of the switches SW1, SW2, SW3, SW4 and SW5 in accordance with the designation of CPU 51.

Figure 3:
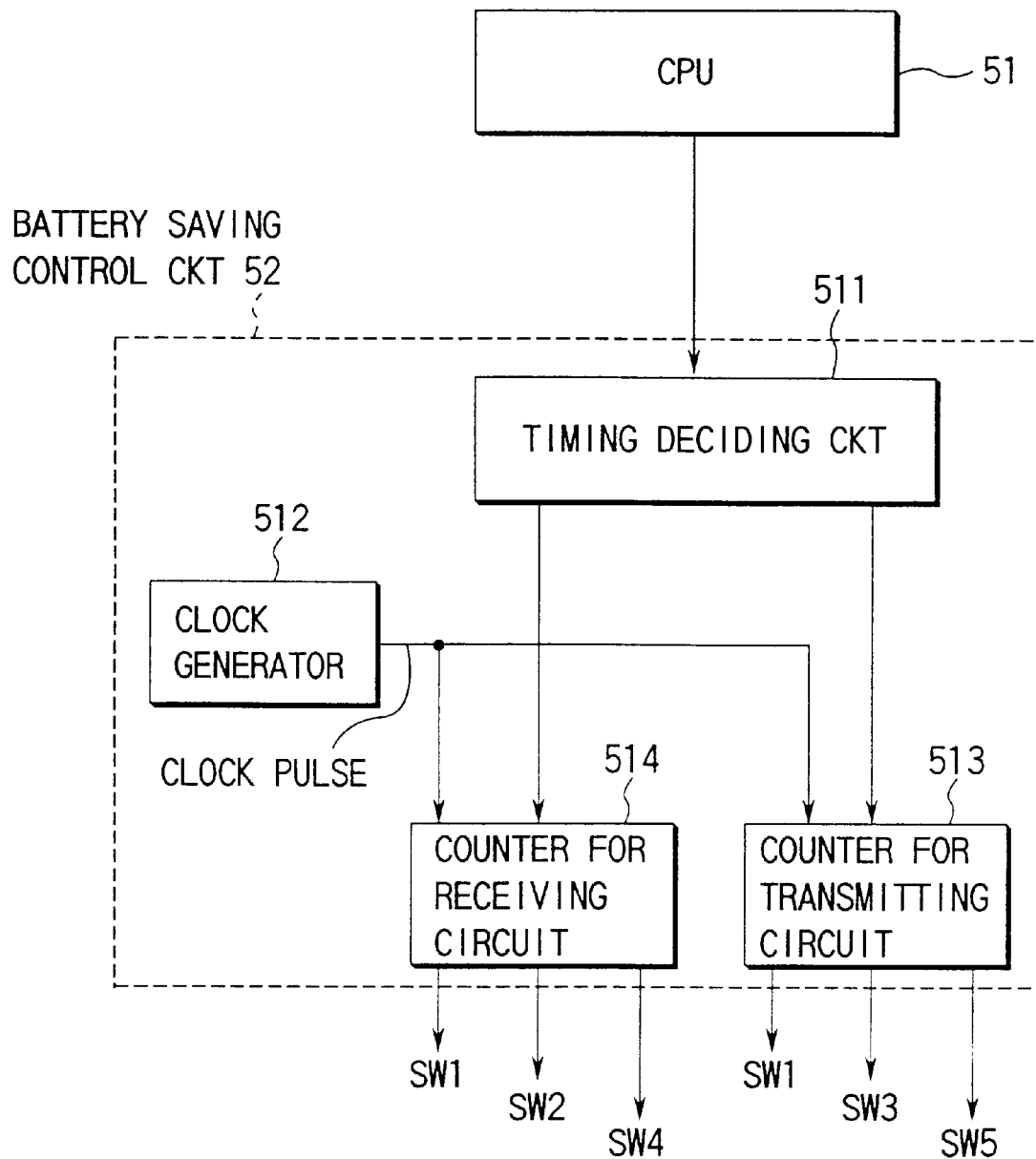
FIG. 3 is a block diagram showing a battery saving control circuit shown in FIG. 2.

FIG. 3 is a block circuit showing the arrangement of the battery saving control circuit 52. The battery saving control circuit 52 comprises a timing deciding circuit 511, a clock generator 512, a counter 513 for the transmitting circuit, and a counter 514 for the receiving circuit.

The timing deciding circuit 511 recognizes transmitting and receiving time slots of an individual mobile station stored in CPU 51. At a terminating timing of the transmitting and receiving time slots, a reset signal is supplied to the counters 513 and 514. The clock generator 512 supplies a clock pulse of a predetermined cycle to these counters. The counters 513 and 514 start the counting of clock pulses from a time point at which the reset signal is input. And at a time point of reaching each of three initially set different count values, the counter 513 outputs a corresponding switch-ON signal to the switches SW1, SW3 and SW5.

Now explanation will be given about the battery saving operation of the mobile communication device thus arranged.

Upon the allocation of an information channel from the base station, not shown, at a speech time, CPU 51 notices corresponding transmitting and receiving time slots used at the individual mobile station to a timing deciding circuit 511 of the battery saving control circuit 52. Upon receipt of this notice, the timing deciding circuit 511 sends reset signals to the counter 513 for the transmitting circuit and counter 514 for the receiving circuit at the time points of terminating the transmitting time slot and receiving time slot. When this is done, the counters 513 and 514 start count operations of clock pulses from a time point at which they receive the reset signals, and the associated switches are ON/OFF controlled in accordance with their count values.

Figure 4:
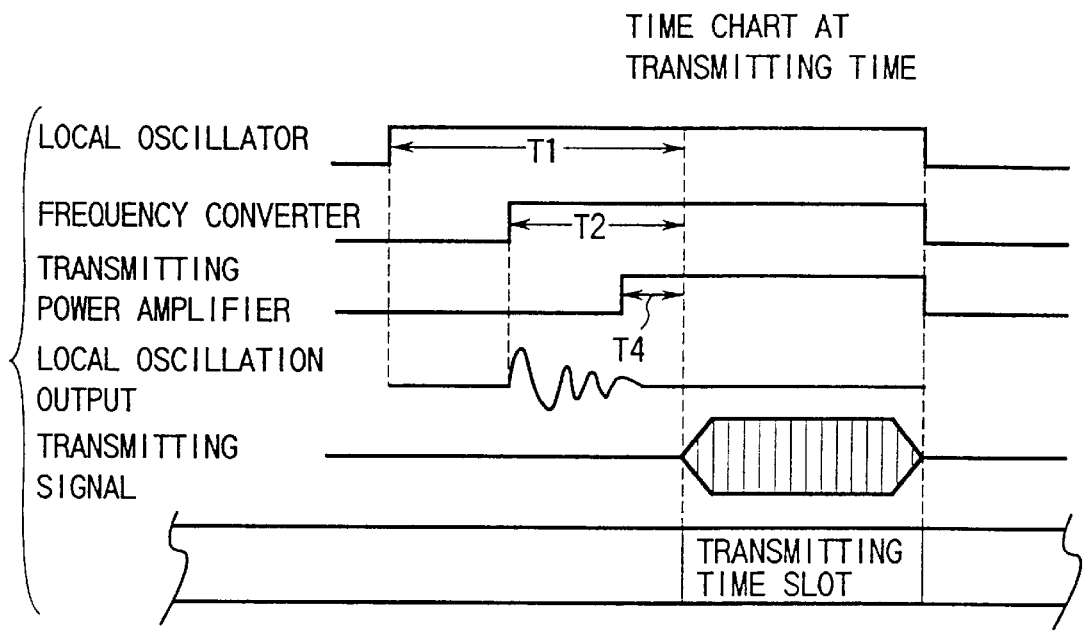
FIG. 4 is a time chart showing the procedure of control by a battery saving control circuit at a transmitting time.

That is, now suppose that, in the counter 513 for receiving circuit, the count value becomes a value corresponding to the operation start timing of the local oscillator 14, that is, a value corresponding to a timing a time period T1 previous to the start time point of the receiving time slot as shown in FIG. 4. Then, a switch-ON signal is output from the counter 513 to the switch SW1. By doing so, the switch SW1 is turned ON, allowing an operation voltage of the power source unit to be supplied to the local oscillator 14. As a result, the local oscillator 14 starts its oscillation operation.

Then suppose that the count value of the counter 513 becomes a value corresponding to an operation start timing of the frequency converter 151 in the transmitting circuit, that is, a value corresponding to a timing a time period T2 previous to the start time point of the transmitting time slot. By doing so, a switch-ON signal is output from the counter 513 to the switch SW3, so that the switch SW3 is turned ON to allow the operation voltage of the power source unit 6 to be supplied to the frequency converter 151. As a result, the frequency converter 151 starts its operation. When this is done, the oscillation frequency of the local oscillator 14 suffers a temporary variation as shown in FIG. 4 due to an influence caused by a load variation at the start of the operation. However, the operation start timing of the frequency counter 151 (that is, the timing the time period T2 earlier than the start timing of the transmitting time slot) is initially set, taking into consideration the time necessary and sufficient for a temporary frequency variation at the local oscillator 14 to converge. For this reason, there is no risk that a variation in the oscillation frequency of the local oscillator 14 at the start operation of the frequency converter 151 will exert an adverse influence over the transmitting operation of the transmitting time slot.

Further suppose that the count value of the counter 513 for the transmitting circuit becomes a value corresponding to the operation start timing of the transmission power amplifier 152, that is, a value corresponding to a timing a time period T4 previous to the start time point of the transmitting time slot. Then a switch-ON signal is output from the counter 513 to the switch SW5. As a result, the switch SW5 is turned ON, so that the operation voltage of the power source unit 6 is supplied to the transmitting power amplifier 152. For this reason, the transmitting power amplifier 152 starts its operation. That is, the transmitting power amplifier 152 starts its operation with a delay of a time period (T2–T4) as compared with the case of the transmitting power amplifier 152. For this reason, the dissipation power of the transmitting power amplifier can be made lower than in the case where the transmitting power amplifier 152 and frequency converter 151 are operated simultaneously.

If, in this state, the transmitting time slot period is involved, transmit data is output from the TDMA encoding circuit 32 and input to the demodulation circuit 22. In the demodulation circuit 22 a transmitting intermediate frequency signal is modulated by the transmit data and the modulated transmitting intermediate frequency signal is input to the transmitting circuit 15. In the transmitting circuit 15, the transmitting signal is mixed with a local oscillation signal from the local oscillator 14 at the frequency converter 151 and, being up-converted to a radio carrier signal, amplified by a transmitting power amplifier 152 to a predetermined transmit level. And it is passed through the high-frequency switch 12 and transmitted from the antenna 11 toward the base station.

At the completion of the transmitting time slot period, a reset signal is supplied from the timing deciding circuit 511 to the counter 513 in the battery saving control circuit 52. Therefore, the counter 513 for the transmitting circuit has its count value reset, so that the switch-ON signals supplied to the switches SW1, SW3 and SW5 are turned OFF. Therefore, any of these switches SW1, SW3 and SW5 are returned back to an OFF state, so that the supply of the operation voltages to the local oscillator 14, frequency converter 151 and transmitting power amplifier 152 is stopped and hence these circuit elements are returned back to the battery-saving state.

Figure 5:
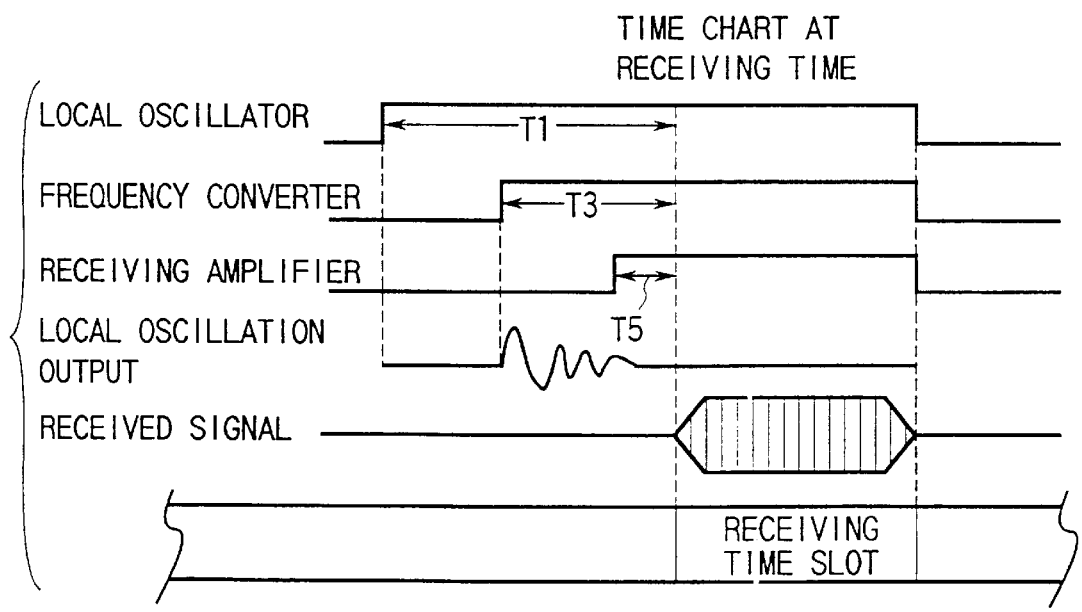
FIG. 5 is a time chart showing the procedure of control by a battery saving control circuit at a receiving time.

Now suppose that the count value of the counter 514 becomes a value corresponding to the operation start timing of the local oscillator 14, that is, a value corresponding to a timing a time period T1 previous to the start time point of the receiving time slot as shown in FIG. 5. By doing so, a switch-ON signal is output from the counter 514 to the switch SW1. With the switch SW1 ON, the operation voltage of the power source unit 6 is supplied to the local oscillator 14, so that the local oscillator 14 starts its oscillation operation.

Then suppose that the count value of the counter 514 becomes a value corresponding to an operation start timing of the frequency converter 131 in the receiving circuit, that is, a value corresponding to a timing a time period T3 previous to the start time point of the receiving time slot. Then, a switch-ON signal is output from the counter 514 to the switch SW2. With the switch SW2 ON, the operation voltage of the power source unit 6 is supplied to the frequency converter 131, so that the frequency converter 131 starts its operation. With the frequency converter 131 so operated, it follows that, as in the operation start time of the frequency converter 151 in the transmitting circuit, the local oscillator 14 has its oscillation frequency temporarily varied, as shown in FIG. 5, due to an adverse influence resulting from a load variation involved at its start operation. However, the operation start timing of the frequency converter 131, that is, the timing a time period T3 earlier than the start time point of the receiving time slot, is initially set, taking into consideration the time necessary and sufficient for a temporary frequency variation at the local oscillator 14 to converge. Therefore, there is no risk that the oscillation frequency variation at the local oscillator at the operation start of the frequency converter 131 will exert an adverse influence over a receiving operation at the receiving time slot.

Then suppose that the count value of the counter 514 becomes a value corresponding to the operation start timing of the receiving amplifiers 132, 133, that is, a value corresponding to a timing a time period T5 previous to the start time point of the reception time slot. Then a switch-ON signal is output from the counter 514 for the receiving circuit to the switch SW4, so that the switch SW4 is turned ON to allow the operation voltage of the power source unit 6 to be supplied to the receiving amplifiers 132, 133. In this way, the receiving amplifiers 132, 133 start their operations. That is, the receiving amplifiers 132, 133 start their operations a time period (T3-T5) later than the frequency converter 131. As a result, the dissipation power of the receiving amplifiers 132, 133 is made lower than in the case where the receiving amplifiers 132, 133 and frequency converter 131 are operated simultaneously.

If, in this state, the reception time slot period is involved, a radio carrier signal from the base station, after being received by the antenna 11, is input through the high-frequency switch 12 to the receiving circuit 13. In the receiving circuit 13, the carrier signal, being high-frequency amplified at the receiving amplifier 132, is mixed at the frequency converter 131 with the local oscillation signal generated from the local oscillator 14 and is down-converted to a reception signal of an intermediate frequency or baseband frequency. Further, the signal is amplified by the receiving amplifier 133 and input to the demodulation circuit 21 in the modem unit 2 where it is modulated.

At the completion of a reception time slot period, a reset signal is supplied from the timing deciding circuit 511 to the counter (for the receiving circuit) 14 in the ba ttery saving control circuit 52. Therefore, the count value of the counter 514 is reset, so that the switch-ON signals supplied to the switches SW1, SW2 and SW4 are turned OFF. As a result, the switches SW1, SW2 and SW4 are returned back to an OFF state, thus stopping the supply of the operation voltages to the local oscillator 14, frequency converter 131 and receiving amplifiers 132, 133. And these circuit elements are returned back to a battery-saving state.

Subsequently, in the same way as set out above, the above-mentioned battery saving operation is repeated during a time period in which communication with the base station is conducted with the transmission time slot and reception time slot.

As set out above, according to the embodiment, the supply power control switches SW1, SW2, SW3, SW4 and SW5 are provided in a way to correspond to the local oscillator 14, transmitting frequency converter 131, receiving frequency converter 151, receiving amplifiers 132 and 133, and transmitting power amplifier 152 in the radio unit 1. And the battery saving control circuit 52 is provided in the battery saving control circuit 52. By separately controlling the ON timing of these switches SW1, SW2, SW3, SW4 and SW5 by means of the battery saving control circuit 52, first the power is supplied to the local oscillator 14 in advance of a time slot applied to the individual mobile station, then the power is supplied to the frequency converters 151, 131, and, after the start of supplying the power to the frequency converters 151 and 131, the supply of the power to the amplifiers 132, 133, 152 is effected, thus being put in a standby state for a transmitting operation or receiving operation.

It is, therefore, possible to reduce any waste power supply time for the respective amplifiers 132, 133 and 152 in comparison with that involved in the conventional case and, by doing so, to reduce the dissipation power involved. Now suppose that the present embodiment is applied to a mobile communication device of such a type as to be 400 mAH as the capacity of the power source unit 6, 4 hours as a continuous speech time, and 200 mA as the dissipation current of the transmitting power amplifier 152 and that the time period T2 at the transmitting power amplifier 152 is reduced from 300 to 100 &LS (T4). Then the average dissipation current at a speech time is 8 mA reduced and it is, therefore, possible to extend the continuous speech time by about 20 minute.

Further, the power supply start timing with respect to the frequency converters 151, 131, is set by taking into consideration a time necessary and sufficient for a temporary oscillation frequency variation at the local oscillator 14 at the operation start of the frequency converters 151, 131 to converge. Therefore, there is no risk at all that the frequency variation will exert an adverse influence over a receiving or a transmitting operation.

Further, according to this embodiment, the ON/OFF control of the switches SW1, SW2, SW3, SW4 and SW5 is made by the counter 513 for the receiving circuit and counter 514 for the receiving circuit. This ensures a relatively simple circuit configuration. In comparison with the case where the battery saving control is done by CPU 51 in a software fashion, it is possible to alleviate the processing burden on CPU 51 and to control accurate timing.

(Second Embodiment)

The second embodiment of the present invention is of such a type that, when a receiving field strength of a radio carrier signal arriving from another base station is to be detected through the utilization of an idle slot, it can individually control the timing of the start of power supply to the local oscillator, frequency converters and receiving amplifier.

Figure 6:
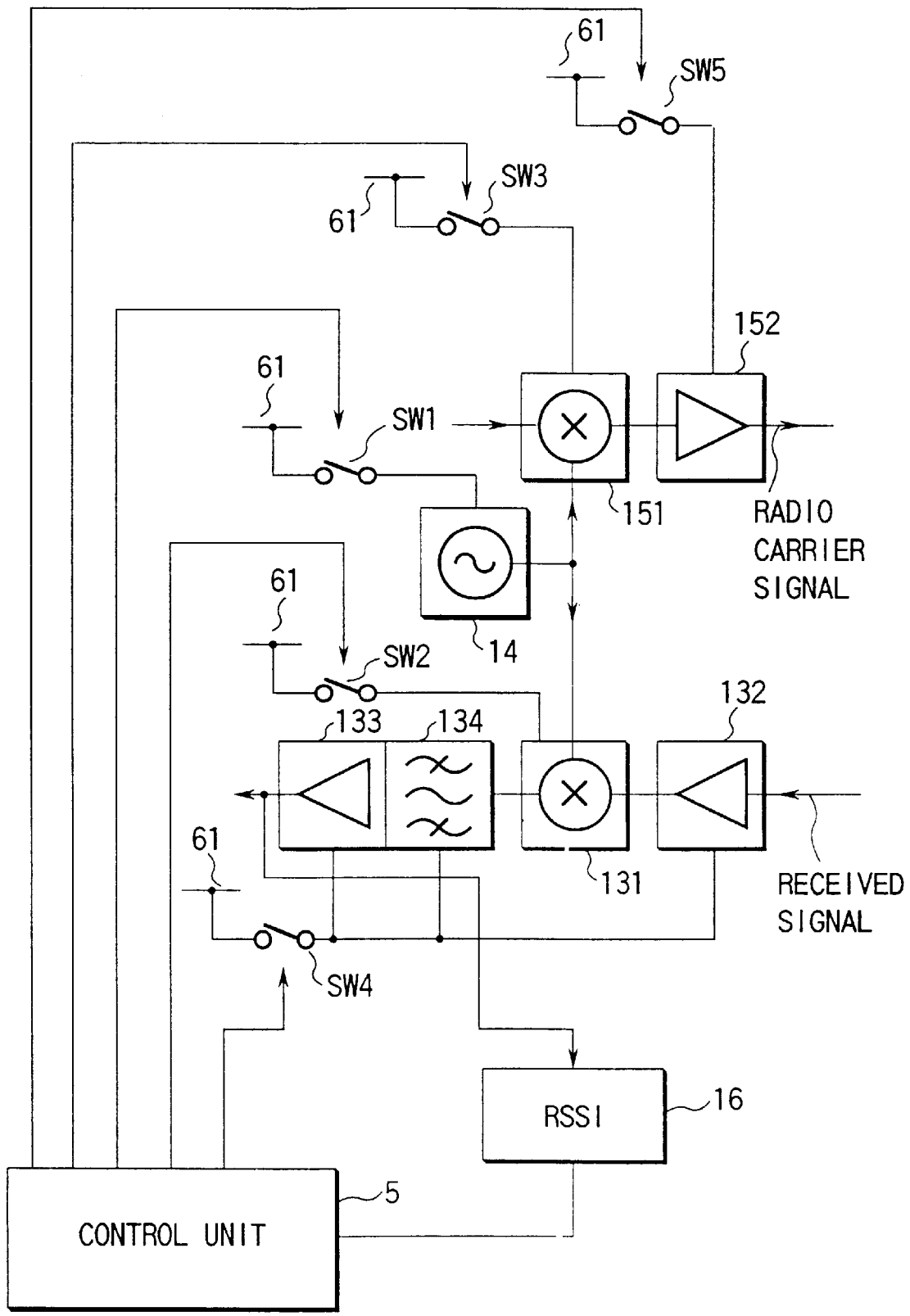
FIG. 6 is a block diagram showing a radio unit in a mobile communication device according to a second embodiment of the present invention.

FIG. 6 is a schematic view showing a major section of a mobile communication device according to the second embodiment of the invention. In FIG. 6, the same reference numerals are employed to designate parts or elements corresponding to those shown in FIG. 2 and further explanation is, therefore, omitted for the sake of brevity.

In FIG. 6, a receiving intermediate frequency signal output from the frequency converter 131, being filtered by an intermediate frequency filter 134, is input to an intermediate frequency amplifier 133 where it is amplified. The amplified signal is input to a demodulation circuit, not shown. Further, the receiving intermediate frequency signal output from the intermediate frequency amplifier 133 is also input to the receiving field strength detection circuit 16. The receiving field strength detection circuit 16 is comprised of, for example, an AM detector. The receiving intermediate frequency signal is AM-detected as an amplitude level. The detected amplitude level is supplied as an RSSI detection signal to a control unit 5.

Figure 7:
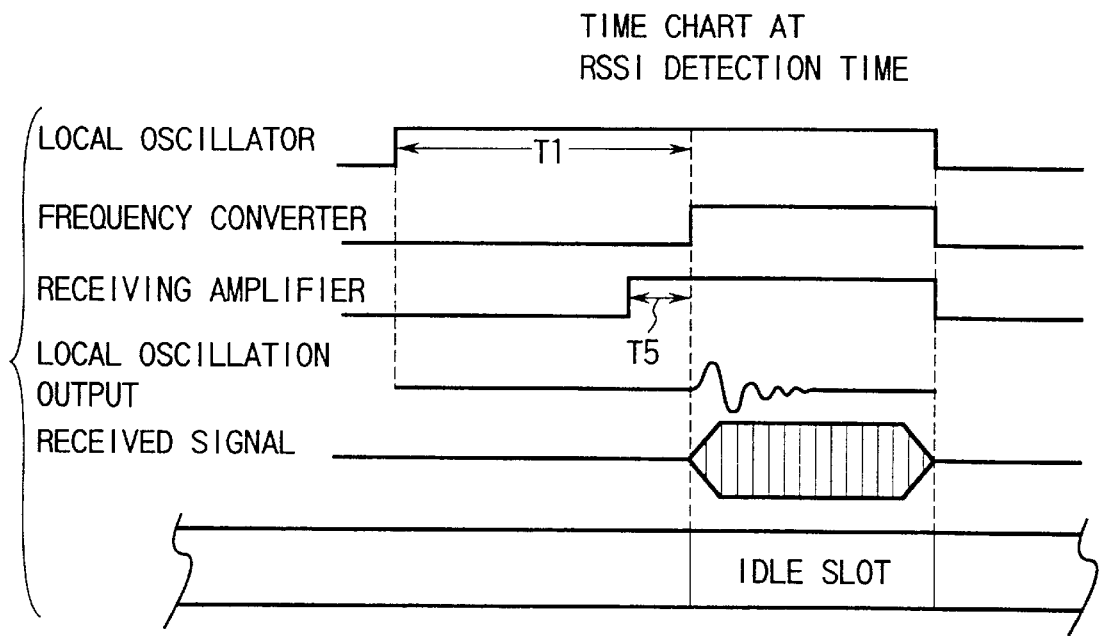
FIG. 7 is a time chart showing the procedure of control by the battery saving control circuit (FIG. 6) at an RSSI detection time.

For the RSSI detection, the control unit 5 performs the following power supply control. FIG. 7 shows a time chart showing its control operation.

That is, at a timing a predetermined time T1 previous to the time point of starting an idle slot time period, a switch-ON signal is output to a switch SW1 from the counter 514 for the receiving circuit. As a result, the switch SW1 is turned ON and an operation voltage of the power source unit 6 is supplied to the local oscillator 14 where an oscillation operation is started.

At a timing a predetermined time T5 previous to the starting point of the idle slot period, a switch-ON signal is output from the counter 514 to a switch SW4 and the switch SW4 is turned ON. As a result, the operation voltage of the power source unit 6 is supplied to the receiving amplifiers 132, 133 and intermediate frequency filter 134.

At this time, the above-mentioned time period T5 is set to be somewhat longer than the starting time of the receiving amplifiers 132, 133 and intermediate frequency amplifier 134. Therefore, the receiving amplifiers 132, 133 and intermediated frequency filter 134 are positively started up before the idle slot period and there is no obstacle to the RSSI detection operation at the idle slot period. The power supply time period T5 before the start of an idle slot relative to the receiving amplifiers 132, 133 and intermediate frequency filter 134 is of a minimal time limit required, so that no waste dissipation of power occurs in the receiving amplifiers 132, 133 and intermediate frequency filter 134.

At the start time point of the idle slot, a switch-ON is output from the counter 514 to the switch SW2 and the switch SW2 is turned ON, thus allowing an operation voltage of the power source unit 6 to be supplied to the frequency converter 131. And the frequency converter 131 starts its operation.

At that time, the oscillation output of the local oscillator 14 causes a frequency variation during an idle slot time period, as shown in FIG. 7, through the power supply to the frequency converter 131. Those frequency components, other than an intermediate frequency band, in the variation of the frequency are cut off at the intermediate frequency filter 134. Even if, in the frequency variation, some frequency passes through the intermediate frequency filter 134, the receiving field strength detection circuit 16 detects an RSSI through an AM demodulation and there is no risk that the frequency variation will exert an adverse influence over that RSSI detection value.

In the second embodiment, therefore, the intermediate frequency filter 134 is provided in the receiving circuit 13 and, in addition, the receiving field strength detection circuit 16 detects the RSSI through the AM demodulation, so that there is no risk that the RSSI detection operation will suffer an adverse influence resulting from the frequency variation of the local oscillation output. As a result, the power supply start timing can be set to be equal to the idle slot start time point, so that any waste power dissipation by the frequency converter 131 can be made nearly zero.

(Other Embodiments)

The present embodiment is not restricted to the first and second embodiments. Although, in the first embodiment for instance, the start timing of the power supply to the transmitting power amplifier 152 and receiving amplifiers 132, 133 is delayed behind the start timing of the power supply to the frequency converters 151, 131, only the timing of the power supply to the frequency converter 512 may be delayed behind the timing of the power supply to the frequency converter 151.

Since, normally, the dissipation power of the transmitting power amplifier 152 is markedly greater than that of the amplifiers 132, 133, it is possible to achieve a prominent battery saving effect by an extent that it is possible to reduce the dissipation power of the transmitting power amplifier 152. In this case, the power supply switch SW4 for the power supply to the receiving amplifiers 132, 133 can be shared by the switch SW2 for the power supply to the frequency converter 131. The resultant circuit arrangement can be made simpler and smaller by that extent.

Although, in the first embodiment, the switch-ON signal is generated with the use of the counters 513, 514, only the switch-ON signal may be delivered from the counters 513, 514 to the switch SW1 for the local oscillator 14 and the switch-ON signals relative to the switches SW2, SW3, SW4 and SW5 of the frequency converter 131, frequency converter 151, amplifiers 132, 133 and amplifier 152 may be generated by supplying switch-ON signals through the delaying of a delay circuit.

Further, in the case where the detection circuit, such as an orthogonal detector, having a frequency conversion function and wave detection function is provided, it may be possible to control power supply to the wave detection circuit.

Although, in the first and second embodiments, the PCS terminal device has been explained by way of example, the present invention may be applied to a hand-held telephone set and a pager as well as to a terminal device for use in a wireless LAN.

For the type and arrangement of the mobile communication device, arrangement of the radio unit, battery saving control circuit and switch arrangement, power supply start timing by the battery saving control circuit relative to the local oscillator, frequency converter and respective amplifiers, etc., the present invention can be variously changed or modified without departing from the spirit and scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A mobile communication device including a radio unit at least equipped with a local oscillator, a frequency converter and a transmitting power amplifier and a power source unit for generating a power necessary for the operation of the radio unit and adapted to, convert a modulated transmitting signal to a radio frequency signal through mixing, at the frequency converter, with a transmitting local oscillation signal generated from the local oscillator and, to amplify the converted signal with the transmitting power amplifier, and to transmit the amplified signal over a previously allocated transmission period, comprising:

first, second and third switches individually inserted at a power supply path between a power source unit and the local oscillator, the frequency converter and the transmitting power amplifier;

first power supply control means for turning on the first switch at a first predetermined time previous to a start time point of the transmission period to start a power supply to the local oscillator;

second power supply control means for turning on the second switch after the start of the power supply to the local oscillator but at a second predetermined time previous to the start time point of the transmission period to start a power supply to the frequency converter; and third power supply control means for turning on the third switch after the start of the power supply to the frequency converter but at a third predetermined time previous to the start time point of the transmission period, to start a power supply to the transmitting power amplifier.

2. The mobile communication device according to claim 1, wherein the second power supply control means turns on the second switch after the start of the power supply to the local oscillator but a given time previous to the start point of the transmission period and for starting the power supply to the frequency converter, the given time being a time at which an output variation at the local oscillator resulting from the start operation of the frequency converter becomes stabilized.

3. The mobile communication device according to claim 1, wherein the third power supply control means turns on the third switch after the start of the power supply to the frequency converter but at the given time previous to the start time point of the transmission period, the given time is based on a feature of the transmitting power amplifier.

4. A mobile communication device-including a radio unit at least equipped with a local oscillator, a frequency converter and a received signal reproducing circuit and a power supply unit for generating power necessary for the operation of the radio unit and adapted to convert a signal of a lower frequency than that of a radio carrier signal through mixing, at the frequency converter, between a received radio carrier signal and a local oscillation signal generated from the local oscillator and, on the basis of the frequency converted signal, reproduce the received signal at the received signal reproducing circuit, comprising:

first, second and third switches individually inserted at a power supply path between the power source unit and the local oscillator, the frequency converter and the receiving reproducing circuit;

first power supply control means for turning on the first switch at a first predetermined time previous to a start time point of a reception period to start a power supply to the local oscillator;

second power supply control means for turning on the second switch after the start of the power supply to the local oscillator but at more than a second predetermined time previous to the start time point of the reception period to start a power supply to the frequency converter; and third power supply control means for turning on the third switch after the start of the power supply to the frequency converter but at more than a third predetermined time previous to the start time point of the reception period to start a power supply to the received signal reproducing circuit.

5. The mobile communication device according to claim 4, wherein the second power supply control means turns on the second switch after the start of the power supply to the local oscillator but a given time of the reception period, the given time being a time at which an output variation at the local oscillator resulting from the start operation of the frequency converter becomes stabilized.

6. The mobile communication device according to claim 4, wherein the second power supply control means turns on the third switch after the start of the power supply to the frequency converter but at the given time previous to the start time of the received signal reproducing circuit, the given time is based on a feature of the received signal reproducing circuit.

7. The mobile communication device according to claim 4, wherein the received signal reproducing circuit is at least comprised of amplifiers each at a preceding and subsequent stage of the frequency converter and a wave detector for detecting a frequency-converted signal.

8. The mobile communication device according to claim 4, wherein the received signal reproducing circuit has amplifiers each provided at a preceding and subsequent stage of the frequency converter and the frequency converter has the function of converting a radio carrier signal to a baseband signal by a direct conversion scheme and, at the same time, demodulating the radio carrier signal.

9. A mobile communication device including a radio unit at least equipped with a receiving amplifier circuit having a local oscillator, a frequency converter and a intermediate frequency filter and a power source unit generating a power necessary for the operation of the radio unit and adapted to, over an idle period, down-convert the received intermediate frequency signal through mixing, at the frequency converter, between the received radio carrier signal and a local oscillation signal originating from the local oscillator and, after allowing the received intermediate frequency signal to provide to the intermediate frequency filter-equipped receiving amplifier circuit, detect a received field strength, comprising:

first, second and third switches individually inserted at a power supply path between the power source unit and the local oscillator, the frequency converter and the receiving amplifier circuit;

first power supply control means for turning on the first switch at a predetermined time previous to a start time point of the idle period to start the power supply to the local oscillator;

second power supply control means for turning on the second switch after the start of the power supply to the local oscillator but a second predetermined time previous to the start time point of the idle period to start the power supply to the frequency converter; and third power supply control means for turning on the third switch after the start of the power supply to the local oscillator but a third predetermined time previous to the idle period to start the power supply to the receiving amplifier circuit.

10. The mobile communication device according to claim 9, wherein the second power supply control means turns on the second switch at a start time of the idle period to start the power supply to the frequency converter.

11. The mobile communication device according to claim 9, wherein the third power supply control means turns on the third switch after the start of conduction to the local oscillator but by more than the start-up period of the receiving amplifier circuit previous to the start time point of the idle period to start the power supply to the receiving amplifier circuit.

12. A battery saving method for a mobile communication device including a radio unit at least equipped with a local oscillator, a frequency converter and a power transmitting amplifier and a power source unit for generating a power necessary for an operation of the radio unit and adapted to, convert a demodulated transmitting signal to a radio frequency signal through mixing, at the frequency converter, with a local oscillation signal generated from the local oscillator and, to amplify the converted signal with the transmitting power amplifier, and to transmit the amplified signal over a previously allocated transmission period, comprising the steps of:

(1) starting a power supply to the local oscillator at a predetermined time previous to a start time point of the transmission period;

(2) starting a power supply to the frequency converter after a start-up time of the power supply to the local oscillator but a given time previous to the start time point of the transmission period, the given time being a time at which an output variation of the local oscillator resulting from the start operation of the frequency converter becomes stabilized; and (3) starting the power supply to the transmitting power amplifier after the start of the power supply to the frequency converter but at the given time previous to the start time point of the transmission period.

13. A battery saving method for a mobile communication device including a radio unit at least equipped with a local oscillator, a frequency converter and a received signal reproducing circuit and a power source unit generating a power necessary for the operation of the radio unit and adapted to, convert a signal of a lower frequency than that of the radio frequency signal through mixing, at the frequency converter, between the received radio carrier signal and a local oscillation signal generated from the local oscillator and, based on the frequency-converted signal, reproduce a received signal at the received signal reproducing circuit, comprising the steps of:

(1) starting a power supply to the local oscillator at a predetermined time previous to a start time point of the idle period;

(2) starting a power supply to the frequency converter after the start of a power supply to the local oscillator but a given time previous to the start time point of the reception period, the given time being a time at which an output variation at the local oscillator resulting from the start operation of the frequency converter becomes stabilized; and (3) starting the power supply to the received signal reproducing circuit after the start of the power supply to the frequency converter but at more than a start-up time of the received signal reproducing circuit previous to the start time point of the reception period.

14. A battery saving method for a mobile communication device including a radio unit at least equipped with a local oscillator, a frequency converter and a received field strength detection circuit and a power source unit for generating a power necessary for the operation of the radio unit and adapted to, over an idle period other than previously allocated transmission and reception periods, convert the received radio carrier signal to a signal of a lower frequency than that of the radio carrier signal through mixing, at the frequency converter, with a local oscillation signal originating from the local oscillator and, based on the frequency-converted signal, detect a received field strength by the received field strength detection circuit, comprising the steps of:

(1) starting a power supply to the local oscillator a predetermined time previous to a start time point of the idle period;

(2) starting a power supply to the received field strength detection circuit after the start of conduction to the local oscillator but either simultaneously with the idle period or at more than the starting-up time of the received field strength detection circuit previous thereto; and (3) starting a power supply to the frequency converter after the start of the power supply to the local oscillator but before more than the power supply starting point to the received field strength detection circuit.

15. In a mobile communication device including a radio unit at least equipped with a local oscillator, a frequency converter and a transmitting power amplifier and a power source unit for generating a power necessary for the operation of the radio unit and adopted to, convert a modulated transmitting signal to a radio frequency signal through mixing, at the frequency converter, with a local oscillation signal originating from the local oscillator and, to amplify the converted signal, transmit an amplified signal over a previously allocated transmission period, the radio unit comprising:

first, second and third switches individually inserted at a power supply path between the power source unit and the local oscillator, frequency converter and transmitting power amplifier;

first power supply control means for turning on the first switch at a first predetermined time previous to a start time point of the transmission period to start a power supply to the local oscillator;

second power supply control means for turning on the second switch after the starting of a power supply to the local oscillator but at a second predetermined time previous to the start time point of the transmission period and for starting a power supply to the frequency converter; and third power supply control means for turning on the third switch after the starting of a power supply to the frequency converter but at a third predetermined time previous to the start time point of the transmission period to start the power supply to the transmitting power amplifier with the third switch turned ON.

16. In a mobile communication device including a radio unit at least equipped with a local oscillator, a frequency converter and a received signal reproducing circuit and a power source unit generating a power necessary to generate a power necessary to the operation of the radio unit and adapted to, convert the received radio carrier signal to a signal of a lower frequency than the radio carrier signal through mixing, at the frequency converter, with a local oscillation signal originating from the local oscillator and, based on the frequency converted signal, reproduce a received signal from the received signal reproduction circuit, the radio unit comprising:

first, second and third switches individually inserted between the power source unit and the local oscillator, frequency converter and received signal reproducing circuit;

first power supply control means for turning on the first switch at a first predetermined time previous to a start time point of a reception period to start the power supply to the local oscillator;

second power supply control means for turning on the second switch after the start of the power supply to the local oscillator but at more than a second predetermined time previous to the start time point of the reception period to start the power supply to the frequency converter; and third power supply control means for turning on the third switch after the starting of the power supply to the frequency converter but at more than a third predetermined time previous to the start time point of the reception period to start the power supply to the received signal reproducing circuit.

17. A mobile communication device including a radio unit, the radio unit including a local oscillator, a frequency converter, a transmit power amplifier and power source unit fu generating a power necessary for the operation of the radio unit, and for mixing a modulated transmitting signal with a local oscillation signal generated by the local oscillator at the frequency converter, and for amplifying the mixed modulated transmitting signal and for transmitting the amplified signal during only a predetermined period, comprising:

first control means for supplying power to the local oscillator at a first predetermined time previous to a start time of the predetermined period;

second control means for supplying power to the frequency converter at a second predetermined time previous to the start time of the predetermine period after the start of the power supply to the local oscillator; and third control means for supplying power to the transmitting power amplifier at a third predetermined time preview to the start time of the predetermined period after the start of the power supply to the frequency converter.

* * * * *